(12) United States Patent
Zhu et al.

(10) Patent No.: US 10,582,482 B2
(45) Date of Patent: Mar. 3, 2020

(54) METHOD FOR SELECTING CONTROL CHANNEL, AND APPARATUS

(71) Applicant: HUAWEI TECHNOLOGIES CO., LTD., Shenzhen, Guangdong (CN)

(72) Inventors: Song Zhu, Beijing (CN); Xin Xiong, Beijing (CN); Weiliang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 15/659,033

(22) Filed: Jul. 25, 2017

(65) Prior Publication Data
US 2017/0325204 A1    Nov. 9, 2017

Related U.S. Application Data

(63) Continuation of application No. PCT/CN2015/071580, filed on Jan. 26, 2015.

(51) Int. Cl.
*H04W 72/04* (2009.01)
*H04W 72/08* (2009.01)

(52) U.S. Cl.
CPC ....... *H04W 72/042* (2013.01); *H04W 72/085* (2013.01)

(58) Field of Classification Search
CPC .. H04W 72/042; H04W 72/085; H04L 5/006; H04L 5/0053
See application file for complete search history.

(56) References Cited

U.S. PATENT DOCUMENTS

| 5,420,850 A | * | 5/1995 | Umeda | H04B 7/2628 370/342 |
| 5,884,184 A | * | 3/1999 | Sheffer | H04W 24/10 340/3.1 |

(Continued)

FOREIGN PATENT DOCUMENTS

| CN | 101594639 A | 12/2009 |
| CN | 102986158 A | 3/2013 |

(Continued)

OTHER PUBLICATIONS

International Search Report dated Oct. 29, 2015 in corresponding International Patent Application No. PCT/CN2015/071580.

(Continued)

*Primary Examiner* — Ivan O Latorre
(74) *Attorney, Agent, or Firm* — Leydig, Voit & Mayer, Ltd.

(57) ABSTRACT

Embodiments of the present invention disclose a method for selecting a control channel, and are applied to a communication system, to enable UE to select a control channel suitable for itself in a multi-control channel communications system. The method includes: listening, by UE, to a first control channel, and measuring a value of a performance parameter of a signal received by using the first control channel, and the first control channel is one of the at least two control channels; and when determining, according to the value of the performance parameter, that the first control channel meets a residence condition, determining the first control channel as a target control channel, where the target control channel is used to receive downlink control information sent by a base station.

16 Claims, 3 Drawing Sheets

---

Determine a value of a receive performance parameter of UE according to a signal received by using a synchronization channel and/or a broadcast channel, where the receive performance parameter includes one or more of the following: a signal-to-noise ratio, a receive level, a signal to interference plus noise ratio, or signal strength  /201

Determine a control channel that meets a preliminary selection condition in the at least two control channels as the first control channel  /202

(56) References Cited

U.S. PATENT DOCUMENTS

| | | | |
|---|---|---|---|
| 2008/0233992 A1* | 9/2008 | Oteri | H04W 52/241 |
| | | | 455/522 |
| 2009/0137262 A1 | 5/2009 | Willenegger et al. | |
| 2010/0157922 A1 | 6/2010 | Kim et al. | |
| 2011/0026481 A1 | 2/2011 | Takamatsu | |
| 2012/0113832 A1 | 5/2012 | Montojo et al. | |
| 2014/0086173 A1* | 3/2014 | Sadeghi | H04L 5/005 |
| | | | 370/329 |
| 2014/0161063 A1 | 6/2014 | Yeh et al. | |
| 2015/0078284 A1 | 3/2015 | Lee et al. | |
| 2016/0192337 A1 | 6/2016 | Wengerter et al. | |

FOREIGN PATENT DOCUMENTS

| | | |
|---|---|---|
| CN | 103096424 A | 5/2013 |
| CN | 103986566 A | 8/2014 |
| EP | 2413628 A1 | 2/2012 |
| JP | H08-149554 A | 6/1996 |
| JP | 2002-528017 A | 8/2002 |
| JP | 2010-516129 A | 5/2010 |
| WO | WO0130108 | 4/2001 |
| WO | 2009/119767 A1 | 10/2009 |
| WO | WO2013157899 | 10/2013 |

OTHER PUBLICATIONS

Japanese Office Action dated Aug. 20, 2018 in corresponding Japanese Patent Application No. 2017-539310, 23 pgs.
Extended European Search Report, dated Dec. 6, 2017, in European Application No. 15879323.2 (8 pp.).
Office Action, dated Dec. 24, 2018, in Chinese Application No. 201580024223.4 (8 pp.).
International Search Report dated Oct. 29, 2015 in corresponding to International Patent Application No. PCT/CN2015/071580.

* cited by examiner

METHOD FOR SELECTING CONTROL CHANNEL, AND APPARATUS

CROSS-REFERENCE TO RELATED APPLICATIONS

This application is a continuation of International Application No. PCT/CN2015/071580, filed on Jan. 26, 2015, the disclosure of which is hereby incorporated by reference in its entirety.

TECHNICAL FIELD

The present invention relates to the communications field, and in particular, to a method for selecting a control channel, and an apparatus.

BACKGROUND

With continuous development of communications technologies, machine-to-machine (M2M) services emerge as the times require and have been widely applied to fields such as intelligent electric power, intelligent transportation, and intelligent home. Because user equipment (UE for short) that uses an M2M service is usually deployed in a confined space such as a basement, to ensure that the UE can normally communicate with a network side, a coverage enhancement technology is proposed in many communications systems. For example, as compared with a common communications system, coverage is enhanced by 20 dB.

It is well known that in an existing cellular system, considering reliability of control channel transmission, a network side usually configures a control channel by using a relatively low-level modulation and coding scheme. However, for a cellular system that uses the coverage enhancement technology, the system may configure different control channels for different coverage levels. For a user in relatively good coverage, the network side configures a control channel by using a relatively high-level modulation and coding scheme. For a user in relatively poor coverage, the network side configures a control channel by using a relatively low-level modulation and coding scheme. When a system configures different control channels for different coverage levels, how UE selects a control channel suitable for itself is a problem that urgently needs to be resolved by persons skilled in the art. However, in the prior art, there is no technical solution for resolving the problem.

SUMMARY

Embodiments of the present invention provide a method for selecting a control channel, and an apparatus, to enable UE to select a control channel suitable for itself in a multi-control channel communications system.

To achieve the foregoing objective, the following technical solutions are used in the embodiments of the present invention.

According to a first aspect, a method for selecting a control channel is provided. The method is applied to a communications system in which at least two control channels are configured, and includes:

listening, by user equipment UE, to a first control channel, and measuring a value of a performance parameter of a signal received by using the first control channel, where the performance parameter includes one or more of the following: a signal-to-noise ratio, a receive level, a signal to interference plus noise ratio, or signal strength, and the first control channel is one of the at least two control channels; and when determining, according to the value of the performance parameter, that the first control channel meets a residence condition, determining the first control channel as a target control channel, where the target control channel is used to receive downlink control information sent by a base station.

With reference to the first aspect, in a first possible implementation manner, that the first control channel meets a residence condition includes: the value of the performance parameter is greater than or equal to a sum of a demodulation threshold and a residence threshold of the first control channel, and the residence threshold is greater than or equal to zero.

With reference to the first possible implementation manner of the first aspect, in a second possible implementation manner, that the first control channel meets a residence condition further includes: the signal received by using the first control channel is successfully decoded.

With the first aspect or the first possible implementation manner or the second possible implementation manner of the first aspect, in a third possible implementation manner, before the listening, by user equipment UE, to a first control channel, and measuring a value of a performance parameter of a signal received by using the first control channel, the method further includes:

determining a value of a receive performance parameter of the UE according to a signal received by using a synchronization channel and/or a broadcast channel, where the receive performance parameter includes one or more of the following: a signal-to-noise ratio, a receive level, a signal to interference plus noise ratio, or signal strength; and determining a control channel that meets a preliminary selection condition in the at least two control channels as the first control channel, where the control channel that meets the preliminary selection condition includes: a control channel whose receive performance parameter has a value greater than or equal to K, where K is a sum of a demodulation threshold and a preliminary selection threshold of the control channel, and the preliminary selection threshold is greater than or equal to zero.

With reference to the third possible implementation manner of the first aspect, in a fourth possible implementation manner, M control channels are configured in a cell in which the UE is located, where M≥2, and M is an integer; in a sequence obtained by sorting the M control channels in ascending order by demodulation thresholds, a demodulation threshold of an $i^{th}$ control channel is an $i^{th}$ demodulation threshold, where 1≤i≤M, and i is an integer; the value of the receive performance parameter is k; a sum of the $i^{th}$ demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k≤$K_{i+1}$, and 1≤i≤M−1, the control channel that meets the preliminary selection condition is a control channel having the $i^{th}$ demodulation threshold in the M control channels.

With reference to the third possible implementation manner or the fourth possible implementation manner of the first aspect, in a fifth possible implementation manner, when a quantity of control channels that meet the preliminary selection condition is greater than 1, the determining a control channel that meets a preliminary selection condition in the at least two control channels as the first control channel includes:

randomly selecting a control channel from all of the control channels that meet the preliminary selection condition as the first control channel; or determining, according to an identifier of the UE, the first control channel from all of the control channels that meet the preliminary selection condition; or receiving a notification message sent by the base station, and determining the first control channel according to the notification message, where the notification message carries information about a control channel that has lowest load and that is determined by the base station according to load statuses of all of the control channels that meet the preliminary selection condition; or determining the first control channel according to load statuses of all of the control channels that meet the preliminary selection condition.

With reference to the fourth possible implementation manner of the first aspect, in a sixth possible implementation manner, the target control channel is the $i^{th}$ control channel; and after the determining the target control channel, the method further includes:

when i=M, if $k<K_i'$, determining a new target control channel from other M−1 control channels, where $K_i'\leq K_i$; or when $1<i\leq M-1$, if $k<K_i'$ or $k\geq K_{i+1}'$, determining a new target control channel from other M−1 control channels, where $K_i'\leq K_i$, and $K_{i+1}'\geq K_{i+1}$; or when i=1, if $k\geq K_{i+1}'$, determining a new target control channel from other M−1 control channels, where $K_{i+1}'\geq K_{i+1}$.

With reference to any one of the first aspect or the first possible implementation manner to the sixth possible implementation manner of the first aspect, in a seventh possible implementation manner, the first control channel is a control channel of the cell in which the UE is located; and when determining, according to the value of the performance parameter, that the first control channel does not meet the residence condition, the method further includes:

if there is a control channel that meets the residence condition in other control channels of the cell in which the UE is located, determining a control channel that meets the residence condition in the other control channels as the target control channel; or if there is no control channel that meets the residence condition in other control channels of the cell in which the UE is located, starting a cell reselection mechanism or a cell selection mechanism.

With reference to any one of the first aspect or the first possible implementation manner to the seventh possible implementation manner of the first aspect, in an eighth possible implementation manner, after the determining the target control channel, the method further includes:

determining a random access resource corresponding to the target control channel, and sending a random access message to the base station according to the random access resource, where the random access message is used to instruct the base station to determine the target control channel of the UE according to the random access resource; or sending a random access message to the base station, where the random access message includes channel information of the target control channel, and the random access message is used to notify the base station of the target control channel of the UE.

With reference to the eighth possible implementation manner of the first aspect, in a ninth possible implementation manner, before the sending a random access message to the base station, the method further includes:

obtaining an initial transmit power according to a modulation and coding scheme of a random access channel corresponding to the target control channel; and when the initial transmit power is greater than a maximum transmit power of the UE, re-determining a random access channel corresponding to the target control channel and/or a target control channel, so that a re-obtained initial transmit power is less than or equal to the maximum transmit power of the UE; and the sending a random access message to the base station includes:

sending the random access message to the base station by using the re-obtained initial transmit power.

According to a second aspect, user equipment UE is provided. The UE is applied to a communications system in which at least two control channels are configured, and includes:

a listening and measuring unit, configured to: listen to a first control channel, and measure a value of a performance parameter of a signal received by using the first control channel, where the performance parameter includes one or more of the following: a signal-to-noise ratio, a receive level, a signal to interference plus noise ratio, or signal strength, and the first control channel is one of the at least two control channels; and a determining unit, configured to: when determining, according to the value of the performance parameter, that the first control channel meets a residence condition, determine the first control channel as a target control channel, where the target control channel is used to receive downlink control information sent by a base station.

With reference to the second aspect, in a first possible implementation manner, that the first control channel meets a residence condition includes: the value of the performance parameter is greater than or equal to a sum of a demodulation threshold and a residence threshold of the first control channel, and the residence threshold is greater than or equal to zero.

With reference to the first possible implementation manner of the second aspect, in a second possible implementation manner, that the first control channel meets a residence condition further includes: the signal received by using the first control channel is successfully decoded.

With reference to the second aspect or the first possible implementation manner or the second possible implementation manner of the second aspect, in a third possible implementation manner, the UE further includes: a preliminary selection unit, configured to:

determine a value of a receive performance parameter of the UE according to a signal received by using a synchronization channel and/or a broadcast channel, where the receive performance parameter includes one or more of the following: a signal-to-noise ratio, a receive level, a signal to interference plus noise ratio, or signal strength; and determine a control channel that meets a preliminary selection condition in the at least two control channels as the first control channel, where the control channel that meets the preliminary selection condition includes: a control channel whose receive performance parameter has a value greater than or equal to K, where K is a sum of a demodulation threshold and a preliminary selection threshold of the control channel, and the preliminary selection threshold is greater than or equal to zero.

With reference to the third possible implementation manner of the second aspect, in a fourth possible implementation manner, M control channels are configured in a cell in which the UE is located, where M≥2, and M is an integer; in a sequence obtained by sorting the M control channels in ascending order by demodulation thresholds, a demodulation threshold of an $i^{th}$ control channel is an $i^{th}$ demodulation threshold, where 1≤i≤M, and i is an integer; the value of the receive performance parameter is k; a sum of the $i^{th}$ demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k<$K_{i+1}$, and 1≤i≤M−1, the control channel that meets the preliminary selection condition is a control channel having the $i^{th}$ demodulation threshold in the M control channels.

With reference to the third possible implementation manner or the fourth possible implementation manner of the second aspect, in a fifth possible implementation manner, when a quantity of control channels that meet the preliminary selection condition is greater than 1, the preliminary selection unit is specifically configured to:

randomly select a control channel from all of the control channels that meet the preliminary selection condition as the first control channel; or determine, according to an identifier of the UE, the first control channel from all of the control channels that meet the preliminary selection condition; or determine the first control channel according to a received notification message that is sent by the base station, where the notification message carries information about a control channel that has lowest load and that is determined by the base station according to load statuses of all of the control channels that meet the preliminary selection condition; or determine the first control channel according to load statuses of all of the control channels that meet the preliminary selection condition.

With reference to the fourth possible implementation manner of the second aspect, in a sixth possible implementation manner, the target control channel is an $i^{th}$ control channel; and the determining unit is further configured to:

when i=M, if k<$K_i$', determine a new target control channel from other M−1 control channels, where $K_i$'≤$K_i$; or when 1<i≤M−1, if k<$K_i$' or k≥$K_{i+1}$', determine a new target control channel from other M−1 control channels, where $K_i$'≤$K_i$, and $K_{i+1}$'≥$K_{i+1}$; or when i=1, if k≥$K_{i+1}$', determine a new target control channel from other M−1 control channels, where $K_{i+1}$'≥$K_{i+1}$.

With reference to any one of the second aspect or the first possible implementation manner to the sixth possible implementation manner of the second aspect, in a seventh possible implementation manner, the first control channel is a control channel of the cell in which the UE is located; and the determining unit is further configured to: when determining, according to the value of the performance parameter, that the first control channel does not meet the residence condition, if there is a control channel that meets the residence condition in other control channels of the cell in which the UE is located, determine a control channel that meets the residence condition in the other control channels as the target control channel; or the UE further includes a starting unit, configured to: when it is determined, according to the value of the performance parameter, that the first control channel does not meet the residence condition, if there is no control channel that meets the residence condition in other control channels of the cell in which the UE is located, start a cell reselection mechanism or a cell selection mechanism.

With reference to any one of the second aspect or the first possible implementation manner to the seventh possible implementation manner of the second aspect, in an eighth possible implementation manner, the UE further includes a transmission unit; and the determining unit is further configured to determine a random access resource corresponding to the target control channel, and the transmission unit is configured to send a random access message to the base station according to the random access resource, where the random access message is used to instruct the base station to determine the target control channel of the UE according to the random access resource; or the transmission unit is configured to send a random access message to the base station, where the random access message includes channel information of the target control channel, and the random access message is used to notify the base station of the target control channel of the UE.

With reference to the eighth possible implementation manner of the second aspect, in a ninth possible implementation manner, the UE further includes:

an obtaining unit, configured to obtain an initial transmit power according to a modulation and coding scheme of a random access channel corresponding to the target control channel;

the determining unit is further configured to: when the initial transmit power is greater than a maximum transmit power of the UE, re-determine a random access channel corresponding to the target control channel and/or a target control channel, so that a re-obtained initial transmit power is less than or equal to the maximum transmit power of the UE; and the transmission unit is specifically configured to send the random access message to the base station by using the re-obtained initial transmit power.

According to a third aspect, user equipment UE is provided. The UE is applied to a communications system in which at least two control channels are configured, and includes a memory and a processor, where the memory is configured to store a set of programs, and the programs are used to control the processor to perform the following actions:

listening to a first control channel, and measuring a value of a performance parameter of a signal received by using the first control channel, where the performance parameter includes one or more of the following: a signal-to-noise ratio, a receive level, a signal to interference plus noise ratio, or signal strength, and the first control channel is one of the at least two control channels; and when determining, according to the value of the performance parameter, that the first control channel meets a residence condition, determining the first control channel as a target control channel, where the target control channel is used to receive downlink control information sent by a base station.

With reference to the third aspect, in a first possible implementation manner, that the first control channel meets a residence condition includes: the value of the performance parameter is greater than or equal to a sum of a demodulation threshold and a residence threshold of the first control channel, and the residence threshold is greater than or equal to zero.

With reference to the first possible implementation manner of the third aspect, in a second possible implementation manner, that the first control channel meets a residence condition further includes: the signal received by using the first control channel is successfully decoded.

With reference to the third aspect or the first possible implementation manner or the second possible implementation manner of the third aspect, in a third possible implementation manner, the processor is further configured to:

determine a value of a receive performance parameter of the UE according to a signal received by using a synchronization channel and/or a broadcast channel, where the receive performance parameter includes one or more of the following: a signal-to-noise ratio, a receive level, a signal to interference plus noise ratio, or signal strength; and determine a control channel that meets a preliminary selection condition in the at least two control channels as the first control channel, where the control channel that meets the preliminary selection condition includes: a control channel whose receive performance parameter has a value greater than or equal to K, where K is a sum of a demodulation threshold and a preliminary selection threshold of the control channel, and the preliminary selection threshold is greater than or equal to zero.

With reference to the third possible implementation manner of the third aspect, in a fourth possible implementation manner, M control channels are configured in a cell in which the UE is located, where M≥2, and M is an integer; in a sequence obtained by sorting the M control channels in ascending order by demodulation thresholds, a demodulation threshold of an $i^{th}$ control channel is an $i^{th}$ demodulation threshold, where 1≤i≤M, and i is an integer; the value of the receive performance parameter is k; a sum of the $i^{th}$ demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k<$K_{i+1}$, and 1≤i≤M−1, the control channel that meets the preliminary selection condition is a control channel having the $i^{th}$ demodulation threshold in the M control channels.

With reference to the third possible implementation manner or the fourth possible implementation manner of the third aspect, in a fifth possible implementation manner, when a quantity of control channels that meet the preliminary selection condition is greater than 1, the processor is specifically configured to:

randomly select a control channel from all of the control channels that meet the preliminary selection condition as the first control channel; or determine, according to an identifier of the UE, the first control channel from all of the control channels that meet the preliminary selection condition; or determine the first control channel according to a received notification message that is sent by the base station, where the notification message carries information about a control channel that has lowest load and that is determined by the base station according to load statuses of all of the control channels that meet the preliminary selection condition; or determine the first control channel according to load statuses of all of the control channels that meet the preliminary selection condition.

With reference to the fourth possible implementation manner of the third aspect, in a sixth possible implementation manner, the target control channel is an $i^{th}$ control channel; and the processor is further configured to:

when i=M, if k<$K_i'$, determine a new target control channel from other M−1 control channels, where $K_i'$≤$K_i$; or when 1<i≤M−1, if k<$K_i'$ or k≥$K_{i+1}'$, determine a new target control channel from other M−1 control channels, where $K_i'$≤$K_i$, and $K_{i+1}'$≥$K_{i+1}$; or when i=1, if k≥$K_{i+1}^1$, determine a new target control channel from other M−1 control channels, where $K_{i+1}'$≥$K_{i+1}$.

With reference to any one of the third aspect or the first possible implementation manner to the sixth possible implementation manner of the third aspect, in a seventh possible implementation manner, the first control channel is a control channel of the cell in which the UE is located; and the processor is further configured to:

when determining, according to the value of the performance parameter, that the first control channel does not meet the residence condition, if there is a control channel that meets the residence condition in other control channels of the cell in which the UE is located, determine a control channel that meets the residence condition in the other control channels as the target control channel; or when determining, according to the value of the performance parameter, that the first control channel does not meet the residence condition, if there is no control channel that meets the residence condition in other control channels of the cell in which the UE is located, start a cell reselection mechanism or a cell selection mechanism.

With reference to the third aspect or the first possible implementation manner to the seventh possible implementation manner of the third aspect, in an eighth possible implementation manner, the UE further includes a transmitter; and the processor is further configured to determine a random access resource corresponding to the target control channel, and the transmitter is configured to send a random access message to the base station according to the random access resource, where the random access message is used to instruct the base station to determine the target control channel of the UE according to the random access resource; or the transmitter is configured to send a random access message to the base station, where the random access message includes channel information of the target control channel, and the random access message is used to notify the base station of the target control channel of the UE.

With reference to the eighth possible implementation manner of the third aspect, in a ninth possible implementation manner, the processor is further configured to:

obtain an initial transmit power according to a modulation and coding scheme of a random access channel corresponding to the target control channel; and when the initial transmit power is greater than a maximum transmit power of the UE, re-determine a random access channel corresponding to the target control channel and/or a target control channel, so that a re-obtained initial transmit power is less than or equal to the maximum transmit power of the UE; and the transmitter is specifically configured to send the random access message to the base station by using the re-obtained initial transmit power.

The method for selecting a control channel and the user equipment that are provided in the embodiments of the present invention are applied to a communications system including at least two control channels. UE measures a value of a performance parameter of a signal received by using a first control channel; and when determining, according to the value of the performance parameter, that the first control channel meets a residence condition, determines the first control channel as a target control channel. In this technical solution, a residence condition may be set, so as to enable the UE to select a target control channel suitable for itself.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

First, some terms in this application are explained for convenient understanding by persons skilled in the art.

1) A control channel is a channel used to bear downlink control information (DCI for short) and may also be referred to as a DCI control channel. Specifically, the control channel may be a physical control channel, such as a physical downlink control channel (PDCCH for short), or may be a logical control channel. The DCI may include downlink resource allocation information, hybrid automatic repeat request (HARQ for short) information, power control information, and the like.

Different control channels usually have different coverage levels. Each coverage level corresponds to one modulation and coding scheme (MCS for short), and different coverage levels usually correspond to different MCSs. In particular, alternatively, multiple control channels may have a same coverage level, and this may be specifically embodied in that the multiple control channels have a same MCS. That the multiple control channels have a same MCS includes: the multiple control channels have a same demodulation threshold.

2) A base station refers to a device that communicates with a wireless terminal by means of one or more sectors on an air interface in an access network. For example, a base station may be a base station (or referred to as a base transceiver station, Base Transceiver Station, BTS for short) in a Global System for Mobile Communications (GSM for short) or code division multiple access (CDMA for short) system, or may be a base station (or referred to as a NodeB) in wideband CDMA (WCDMA for short) or Universal Mobile Telecommunications System (UMTS for short), or may be a base station (or referred to as an evolved Node B, evolutional Node B, eNB or e-NodeB) in a Long Term Evolution (LTE for short) system, or may be a WiMAX-BTS in Worldwide Interoperability for Microwave Access (Wi-MAX for short). No limitation is imposed in the present invention.

3) User equipment, which may also be referred to as a terminal, refers to a device that provides voice and/or data connectivity for a user, such as a portable device having a wireless connection function or other processing device connected to a wireless modem decoder.

4) A cell is a radio coverage area identified by a base station identity code or a cell global identification. It is a logical concept, and therefore, may also be referred to as a logical cell.

5) The term "multiple" refers to two or more. The term "and/or" describes only an association relationship for describing associated objects and represents that three relationships may exist. For example, A and/or B may represent the following three cases: Only A exists, both A and B exist, and only B exists. The character "/" generally indicates an "or" relationship between the associated objects. The terms "system", "communications system", and "network" are usually used interchangeably in this specification.

Second, a network architecture of the embodiments of the present invention and a technical problem to be resolved are briefly described.

The embodiments of the present invention may be applied to the foregoing systems, that is, the term "communications system" in the following may be any one of the forgoing systems (such as an LTE system or a UMTS system). One or more cells may be configured for one base station, that is, one or more cells may be configured in one network. One or more control channels may be configured in one cell.

A technical problem that the embodiments of the present invention mainly attempt to resolve is how UE selects a target control channel after accessing a cell. Further, the embodiments of the present invention further provide technical solutions about how to select a new target control channel when a receive performance parameter or the like of the UE changes or when another trigger condition is met, how to enable a base station to learn a target control channel after the UE determines the target control channel, how to determine an initial transmit power of the UE, and so on.

In addition, it should be noted that steps of method embodiments provided in the embodiments of the present invention are all executed by UE. Processes of configuring an MCS of a control channel, a mapping relationship between a control channel and a random access channel, an MCS of a random access channel, and the like in the following may be executed by a network-side device, such as a base station, a base station processor (Base Station Controller, BSC for short), or a radio network controller (RNC for short), in a system. For example, usually, in an LTE system, the foregoing configuration processes are executed by a base station; in a GSM system, the foregoing configuration processes are executed by a base station or a BSC; in a UMTS system, the foregoing configuration processes are executed by a base station or an RNC. For ease of description, the following descriptions are all made by using a "system" as an execution body of the foregoing configuration processes.

The following describes the technical solutions provided in the embodiments of the present invention in detail with reference to accompanying drawings.

Figure 1:
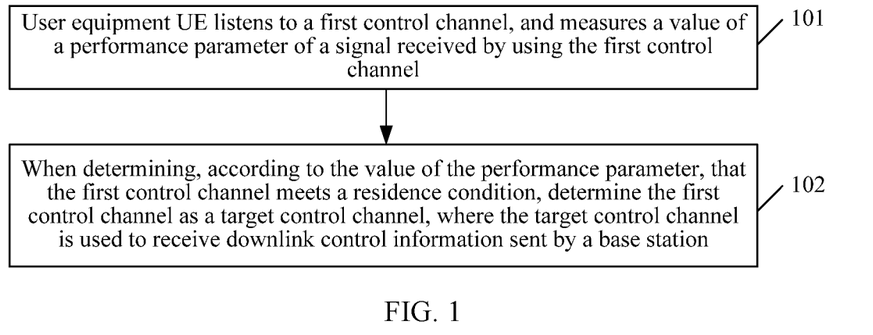
FIG. 1 is a schematic flowchart of a method for selecting a control channel according to an embodiment of the present invention.

An embodiment of the present invention provides a method for selecting a control channel, applied to a communications system in which at least two control channels are configured. As shown in FIG. 1, the method may include the following steps.

101: User equipment UE listens to a first control channel, and measures a value of a performance parameter of a signal received by using the first control channel.

The performance parameter includes, but is not limited to, one or more of the following: a signal-to-noise ratio (Signal Noise Ratio, SNR or S/N for short, also referred to as a signal-to-noise ratio), a receive level, a signal to interference plus noise ratio (that is, a signal to interference plus noise ratio, SINR for short), or signal strength. "Signal strength of a signal" may be specifically power, energy, or the like of the signal, and for example, may be a reference signal received power (RSRP for short).

The "first control channel" may be any one of the at least two control channels, or may be a control channel determined by the UE in the at least two control channels according to a particular policy. The particular policy includes, but is not limited to, a preliminary selection condition described below. Optionally, the first control channel is a control channel of a cell in which the UE is located.

For a specific implementation method used by UE to listen to a first control channel and measure a value of a performance parameter of a signal received by using the first control channel, refer to the prior art.

102: When determining, according to the value of the performance parameter, that the first control channel meets a residence condition, determine the first control channel as a target control channel, where the target control channel is used to receive downlink control information sent by a base station.

Optionally, that the first control channel meets a residence condition includes: the value of the performance parameter is greater than or equal to a sum of a demodulation threshold and a residence threshold of the first control channel, and the residence threshold is greater than or equal to zero. Optionally, the residence threshold is greater than zero.

For example, the "demodulation threshold of the first control channel" refers to a minimum value of a particular performance parameter (such as a signal-to-noise ratio, a receive level, a signal to interference plus noise ratio, or signal strength) that is required when data received by the UE by using the first control channel can be successfully demodulated. The "residence threshold" refers to a threshold that is set for the UE to select a target control channel with better performance, so as to improve demodulation performance of the UE.

Demodulation thresholds of control channels in a cell may be pre-stored in a storage unit of each UE in the cell or may be broadcast by a base station to UEs in the cell by using control channels, so that UE determines a target control channel according to the demodulation thresholds. In addition, the demodulation thresholds of the control channels in the system may be set when the system is built, and the demodulation threshold of each control channel may change dynamically.

It should be noted that because any two of the foregoing performance parameters may be converted into each other, the "demodulation threshold" may be a demodulation threshold of any one of the foregoing performance parameters, and the "residence threshold" may be a residence threshold of any one of the foregoing performance parameters. For a specific implementation manner of conversion between the performance parameters, refer to the prior art. When a type of the performance parameter in step 101, a type of a performance parameter corresponding to the demodulation threshold, and a type of a performance parameter corresponding to the residence threshold are different, values of the performance parameters may be first converted into values of a same type, and then it is determined, according to the converted values, whether the first control channel meets the residence condition.

When there are multiple types of performance parameters in step 101, that the first control channel meets a residence condition may be: values of the multiple types of performance parameters are all greater than or equal to a sum of a corresponding demodulation threshold and a corresponding residence threshold of the first control channel.

Further, optionally, that the first control channel meets a residence condition may further include: the signal received by using the first control channel is successfully decoded. It should be noted that each control channel corresponds to one reference signal, and after receiving a signal by using any control channel, the UE needs to decode the signal according to a reference signal. If the decoding succeeds, it indicates that the UE can correctly receive data that is sent by using the control channel; if the decoding fails, it indicates that the UE cannot correctly receive data that is sent by using the control channel. For a specific implementation manner of decoding and a method of determining whether the decoding succeeds, refer to the prior art.

Optionally, before step 102, the method may further include: determining, according to the value of the performance parameter, whether the first control channel meets the residence condition.

Optionally, when determining, according to the value of the performance parameter, that the first control channel does not meet the residence condition, the method may further include: if there is a control channel that meets the residence condition in other control channels of the cell in which the UE is located, determining a control channel that meets the residence condition in the other control channels as the target control channel; or if there is no control channel that meets the residence condition in other control channels of the cell in which the UE is located, starting a cell reselection mechanism or a cell selection mechanism.

For example, "other control channels" refer to control channels, other than the first control channel, in all control channels of the cell in which the UE is located. For a method of determining whether any one of the "other control channels" meets the residence condition, refer to a method of determining whether the first control channel meets the residence condition provided in any embodiment in this specification, so as to determine the target control channel.

Starting of the cell reselection mechanism or the cell selection mechanism allows the UE to re-select a cell that can be connected to. For specific content of the "cell reselection mechanism" or the "cell selection mechanism", refer to a technical solution for selecting a cell in the prior art. Details are not described herein again.

The method for selecting a control channel that is provided in this embodiment of the present invention is applied to a communications system including at least two control channels. UE measures a value of a performance parameter of a signal received by using a first control channel; and when determining, according to the value of the performance parameter, that the first control channel meets a residence condition, determines the first control channel as a target control channel. In this technical solution, a residence condition may be set, so as to enable the UE to select a target control channel suitable for itself.

Figure 2:
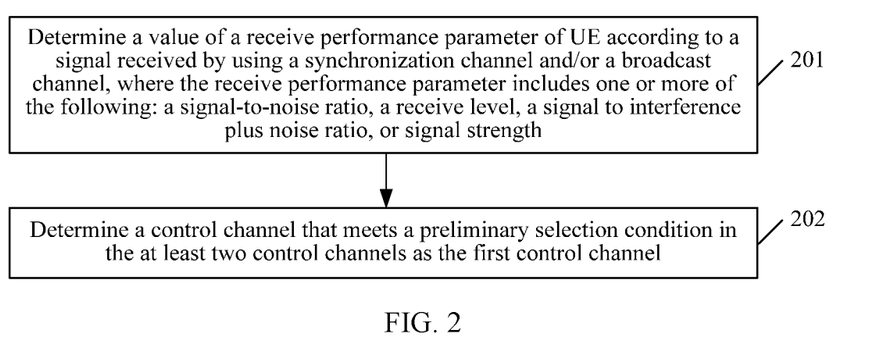
FIG. 2 is a schematic flowchart of a method for determining a first control channel according to an embodiment of the present invention.

Optionally, as shown in FIG. 2, before step 101, the method may further include: determining the first control channel, specifically including the following steps 201 and 202.

201: Determine a value of a receive performance parameter of the UE according to a signal received by using a synchronization channel and/or a broadcast channel, where the receive performance parameter includes one or more of the following: a signal-to-noise ratio, a receive level, a signal to interference plus noise ratio, or signal strength.

After accessing a cell, the UE receives synchronization information that is sent by a base station by using a synchronization channel of the cell and broadcast information that is sent by the base station by using a broadcast channel of the cell.

202: Determine a control channel that meets a preliminary selection condition in the at least two control channels as the first control channel.

It should be noted that, as compared with random selection of a control channel from the control channels configured in the cell in which the UE is located as the first control channel, in this optional implementation manner, the solution of obtaining the first control channel by means of preliminary selection enables the UE to quickly select a control channel suitable for itself, that is, reduces a time for selecting a target control channel. Further, because the time for selecting a target control channel is reduced, power consumption of the UE can be lowered.

The "control channel that meets the preliminary selection condition" is described by using the following two implementation manners as examples.

Implementation Manner 1: The control channel that meets the preliminary selection condition includes: a control channel whose receive performance parameter has a value greater than or equal to K, where K is a sum of a demodulation threshold and a preliminary selection threshold of the control channel, and the preliminary selection threshold is greater than or equal to zero.

An example in which the receive performance parameter is a signal-to-noise ratio is used for description. It is assumed that three control channels, namely, control channels 1, 2, and 3, are configured in the cell in which the UE is located; demodulation thresholds of signal-to-noise ratios corresponding to the control channels 1, 2, and 3 are respectively SINR1, SINR2, and SINR3, where SINR1<SINR2<SINR3; preliminary selection thresholds corresponding to the control channels 1, 2, and 3 are respectively α1, α2, and α3; and a signal-to-noise ratio of the UE is SINR.

Example 1: α1, α2, and α3 are all 0.

Example 2: None of α1, α2, and α3 is 0, and SINR1+α1≤SINR2+α2≤SINR3+α3, where α1, α2, and α3 may be equal or not equal.

Based on Example 1, in Implementation Manner 1, a correspondence between SINR and control channels that may serve as the first control channel is shown in Table 1.

TABLE 1

| Value range of SINR | First control channel |
| --- | --- |
| SINR ≥ SINR3 | Control channel 3 |
| SINR ≥ SINR2 | Control channels 2 and 3 |
| SINR ≥ SINR1 | Control channels 1, 2, and 3 |

Based on Example 2, in Implementation Manner 1, a correspondence between SINR and control channels that may serve as the first control channel is shown in Table 2.

TABLE 2

| Value range of SINR | First control channel |
| --- | --- |
| SINR ≥ SINR3 + α3 | Control channel 3 |
| SINR ≥ SINR2 + α2 | Control channels 2 and 3 |
| SINR ≥ SINR1 + α1 | Control channels 1, 2, and 3 |

Implementation Manner 2: This is another implementation manner proposed based on Implementation Manner 1. It is assumed that M control channels are configured in the cell in which the UE is located, where M≥2, and M is an integer; in a sequence obtained by sorting the M control channels in ascending order by demodulation thresholds, a demodulation threshold of an $i^{th}$ control channel is an $i^{th}$ demodulation threshold, where 1≤i≤M, and i is an integer; and the value of the receive performance parameter is k; a sum of the $i^{th}$ demodulation threshold and the preliminary selection threshold is $K_i$. In this case, Implementation Manner 2 may specifically include:

1) When k≥$K_i$, and i=M, the control channel that meets the preliminary selection condition is a control channel having a maximum demodulation threshold in the M control channels.

2) When $K_i$≤k<$K_{i+1}$, and 1≤i≤M−1, the control channel that meets the preliminary selection condition is a control channel having the $i^{th}$ demodulation threshold in the M control channels.

Based on the foregoing Example 1, in Implementation Manner 2, a correspondence between SINR and control channels that may serve as the first control channel is shown in Table 3.

TABLE 3

| SINR | First control channel |
| --- | --- |
| SINR ≥ SINR3 | Control channel 3 |
| SINR2 ≤ SINR < SINR3 | Control channel 2 |
| SINR1 ≤ SINR < SINR2 | Control channel 1 |

Based on the foregoing Example 2, in Implementation Manner 2, a correspondence between a value range of SINR and control channels that may serve as the first control channel is shown in Table 4.

TABLE 4

| SINR | First control channel |
| --- | --- |
| SINR ≥ SINR3 + α3 | Control channel 3 |
| SINR2 + α2 ≤ SINR < SINR1 + α3 | Control channel 2 |
| SINR3 + α1 ≤ SINR < SINR2 + α2 | Control channel 1 |

Based on Implementation Manner 2, after a target control channel is determined according to any method provided in this specification, the method further includes: determining a new target control channel. It should be noted that the target control channel is a control channel configured in the cell in which the UE is located. Assuming that the target control channel is the $i^{th}$ control channel, the determining a new target control channel may include:

1) when i=M, if k<$K_i'$, determining a new target control channel from other M−1 control channels, where $K_i'$≤$K_i$;

ii) when 1<i≤M−1, if k<$K_i'$ or k≤$K_{i+1}'$, determining a new target control channel from other M−1 control channels, where $K_i'$≤$K_i$, and $K_{i+1}'$≥$K_{i+1}$; or iii) when i=1, if k≥$K_{i+1}'$, determining a new target control channel from other M−1 control channels, where $K_i'$≥$K_{i+1}$.

Based on the foregoing Example 1 or Example 2, in this optional embodiment, a correspondence between a target control channel on which UE resides and a switching condition is shown in Table 5.

TABLE 5

| Target control channel | Switching condition |
|---|---|
| Control channel 3 | SINR < SINR3 + γ3 |
| Control channel 2 | SINR < SINR2 + γ2, or SINR ≥ SINR3 + β3 |
| Control channel 1 | SINR ≥ SINR2 + β2 |

γ3 ≤ α3, γ2 ≤ α2, β3 ≥ α3, and β2 ≥ α2.

It should be noted that a greater value of a performance parameter of a signal received by the UE by using a control channel indicates a stronger coverage capability, that is, a higher coverage level, of the control channel. Therefore, the following sequence may be obtained by sorting the control channels in descending order by coverage capability: control channels 3, 2, and 1.

It can be known from the foregoing description that in this optional implementation manner, it is assumed that the target control channel is the control channel 2. In this case, as SINR dynamically changes, the following cases A) and B) may occur.

A) When SINR<SINR2+γ2, the target control channel is switched from the control channel 2 to the control channel 1, that is, the UE switches from a control channel with a strong coverage capability to a control channel with a poor coverage capability. In this case, because γ2≤α2, it may be considered that, as compared with switching to the control channel 2 (which specifically refers to a process of determining, according to the first control channel, that the target control channel is the control channel 2), a solution of switching from the control channel 2 may be referred to as "quick switching". This can ensure good receive performance.

B) When SINR≥SINR3+β3, the target control channel is switched from the control channel 2 to the control channel 3, that is, the UE switches from a control channel with a poor coverage capability to a control channel with a strong coverage capability. In this case, good receive performance can already be ensured. Because β3≥α3, it may be considered that, as compared with switching to the control channel 2 (which specifically refers to a process of determining, according to the first control channel, that the target control channel is the control channel 2), a solution of switching from the control channel 2 may be referred to as "slow switching". This can reduce a probability of occurrence of a "pingpong" effect caused by degradation of SINR.

When the target control channel is the control channel 1, the UE can switch only from a control channel with a poor coverage capability to a control channel with a strong coverage capability. Specifically, if SINR2+α2≤SINR<SINR3+γ3, a new target control channel may be the control channel 2; if SINR≥SINR3+α3, a new target control channel may be the control channel 3.

When the target control channel is the control channel 3, the UE can switch only from a control channel with a strong coverage capability to a control channel with a poor coverage capability. Specifically, if SINR2+α2≤SINR<SINR3+γ3, a new target control channel may be the control channel 2; if SINR1+α1≤SINR<SINR2+α2, a new target control channel may be the control channel 1.

Further, based on any implementation manner of determining a "control channel that meets the preliminary selection condition" (including the foregoing Implementation Manners 1 and 2), when a quantity of control channels that meet the preliminary selection condition is greater than 1, step 202 may be implemented in any one of the following manners.

Manner 1: Randomly select a control channel from all of the control channels that meet the preliminary selection condition as the first control channel. This manner has a beneficial effect of being easy to implement.

Manner 2: Determine, according to an identifier of the UE, the first control channel from all of the control channels that meet the preliminary selection condition.

For example, the identifier of the UE may also be referred to as an identity (ID for short) and may be specifically a cell radio network temporary identifier (C-RNTI for short), a SAE-Temporary Mobile Subscriber Identity (S-TMSI for short), or another character or character string that can be used to uniquely identify the UE. SAE is an English acronym of system architecture evolution.

Manner 2 may include: determining the first control channel by using a formula: UE ID mod N, where mod is a modulo operation, and N is a quantity of control channels that meet the preliminary selection condition. For example, when N=3, if UE ID mod N=1, a control channel numbered 1 is determined as the first control channel; if UE ID mod N=2, a control channel numbered 2 is determined as the first control channel. This method can balance load of the control channels as much as possible, thereby improving performance of the entire network.

Manner 3: Receive a notification message sent by the base station, and determine the first control channel according to the notification message, where the notification message carries information about a control channel that has lowest load and that is determined by the base station according to load statuses of all of the control channels that meet the preliminary selection condition.

For example, before the receiving a notification message sent by the base station, the method may further include: sending information about all of the control channels that meet the preliminary selection condition to the base station, so that the base station determines, according to the information, a control channel that has lowest load, and sends the notification message to the UE. Manner 3 can balance load of the control channels as much as possible, thereby improving performance of the entire network.

Manner 4: Determine the first control channel according to load statuses of all of the control channels that meet the preliminary selection condition.

For example, Manner 4 may include: using a control channel that has lowest load in all of the control channels that meet the primary condition as the first control channel. Alternatively, the first control channel may be determined on the basis of a performance indicator, that is, the load statuses of the control channels that meet an initial condition, and in combination with any one or more other performance indicators. In this embodiment of the present invention, no limitation is imposed on a specific implementation manner of obtaining, by the UE, the load statuses of the control channels. Manner 4 can balance load of the control channels as much as possible, thereby improving performance of the entire network.

Optionally, this embodiment of the present invention further provides a technical solution about how to enable the base station to learn the target control channel after the target control channel is determined above. Specifically, a random access resource is used to enable the base station to learn the target control channel. The following two implementation manners 1) and 2) are included.

1) Determine a random access resource corresponding to the target control channel, and send a random access message to the base station according to the random access resource, where the random access message is used to instruct the base station to determine the target control channel of the UE according to the random access resource.

For example, there is a one-to-one correspondence between a control channel and a random access resource, and a mapping relationship between the two is configured by the system and may be sent to UEs by using a broadcast channel or the like. The "random access resource" may include, but is not limited to, a radio resource, such as a time domain resource, a frequency domain resource, or a code domain resource.

2) Send a random access message to the base station, where the random access message includes channel information of the target control channel, and the random access message is used to notify the base station of the target control channel of the UE.

For example, after the UE determines the target control channel, the UE needs to initiate a random access if there is uplink data or signaling to be sent, and may further notify, according to the random access resource, the base station of the target control channel (that is, the control channel that the UE is listening to). The "channel information" may include, but is not limited to, downlink channel quality, an index of the target control channel, an index of an MCS corresponding to the target control channel, and the like.

In the foregoing 1) and 2), before the sending a random access message to the base station, the method may further include: obtaining an initial transmit power P0 according to a modulation and coding scheme of a random access channel corresponding to the target control channel; and when P0 is greater than a maximum transmit power Pmax of the UE, re-determining a random access channel corresponding to the target control channel and/or a target control channel, so that a re-obtained initial transmit power is less than or equal to the maximum transmit power of the UE. In this case, the sending a random access message to the base station includes: sending the random access message to the base station by using the re-obtained initial transmit power.

For example, the "random access channel" may be a physical random access channel (PRACH for short). A mapping relationship between a control channel and a random access channel is configured by the system. One control channel may correspond to one or more random access channels, and different random access channels usually have different MCSs. The base station may send, by using the target control channel, the MCS of the random access channel corresponding to the target control channel to the UE, so that the UE determines the initial transmit power.

When the target control channel corresponds to one random access channel, and P0 obtained by the UE according to the MCS of the random access channel is greater than Pmax, a random access channel with a lower-level MCS is determined, to recalculate P0. In this case, the target control channel is changed to another control channel.

When the target control channel corresponds to multiple random access channels, the UE may select a random access channel randomly or according to a rule, to calculate the initial transmit power. Specific content of the rule is not limited in this embodiment of the present invention. When P0 obtained by using an MCS of the selected random access channel is greater than Pmax, a random access channel with a lower-level MCS is determined, to recalculate P0. In this case, the target control channel may remain unchanged. Certainly, if P0 obtained according to an MCS of each random access channel corresponding to the target control channel is greater than Pmax, a target access channel is re-determined.

The obtaining P0 according to an MCS of a random access channel corresponding to the target control channel includes: obtaining a path loss (PL for short) of a downlink of the UE; and obtaining P0 according to the PL and a parameter corresponding to the MCS of the random access channel corresponding to the target control channel. The parameter corresponding to the MCS of the random access channel includes, but is not limited to: an initial received target power (represented by Ptarget) of the random access channel, and a reference signal transmit power Ptransmit of the random access channel. Specifically, the following may be included.

The UE measures a reference signal received power RSRP of a random access channel corresponding to the target control channel; obtains a PL by using a formula PL=Ptransmit-RSRP; and obtains P0 by using a formula P0=a*PL+Ptarget+(n−1)*S, where S represents a power ramp step, $0<a\leq1$, both a and S may be carried in a system broadcast message and sent by the base station to the UE or may be values that are agreed upon in advance in a communications protocol, and n represents a quantity of times a random access message is sent. It should be noted that in a process of sending, by the UE, a random access message to the base station, if excessively small P0 is used, the current transmission of the random access message fails. In this case, power ramping needs to be performed, to calculate new P0, so as to resend a random access message.

It should be noted that if P0 obtained for the first time is less than or equal to Pmax, the random access message is sent to the base station by using P0. If re-obtained P0 is greater than Pmax, an action of "re-determining a random access channel corresponding to the target control channel and/or re-determining a target control channel" is performed repeatedly, until re-obtained P0 is less than or equal to Pmax. The random access message is sent to the base station by using the re-obtained initial transmit power. If P0 obtained by using an MCS of each random access channel is greater than Pmax, it is considered that P0=Pmax.

Figure 3:
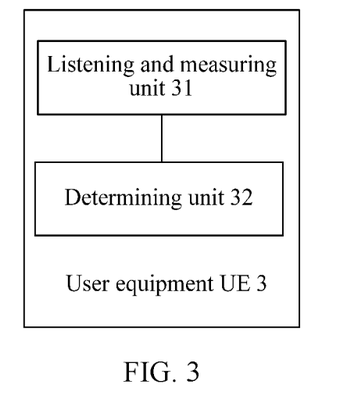
FIG. 3 is a schematic structural diagram of user equipment UE according to an embodiment of the present invention.

FIG. 3 shows user equipment UE 3 according to an embodiment of the present invention. The UE 3 is applied to a communications system in which at least two control channels are configured, and is configured to execute the method for selecting a control channel that is provided above. For relevant explanations in this embodiment, refer to the foregoing embodiments. The UE 3 includes:

a listening and measuring unit 31, configured to: listen to a first control channel, and measure a value of a performance parameter of a signal received by using the first control channel, where the performance parameter includes one or more of the following: a signal-to-noise ratio, a receive level, a signal to interference plus noise ratio, or signal strength, and the first control channel is one of the at least two control channels; and a determining unit 32, configured to: when determining, according to the value of the performance parameter, that the first control channel meets a residence condition, determine the first control channel as a target control channel, where the target control channel is used to receive downlink control information sent by a base station.

It should be noted that, during specific implementation, the UE 3 may further include a receiving unit 33 configured to receive a signal by using the first control channel. Certainly, in the following optional implementation manners, the receiving unit may further be configured to receive other information, which is not enumerated herein.

Optionally, that the first control channel meets a residence condition includes: the value of the performance parameter is greater than or equal to a sum of a demodulation threshold and a residence threshold of the first control channel, and the residence threshold is greater than or equal to zero.

Optionally, that the first control channel meets a residence condition further includes: the signal received by using the first control channel is successfully decoded.

Figure 4:
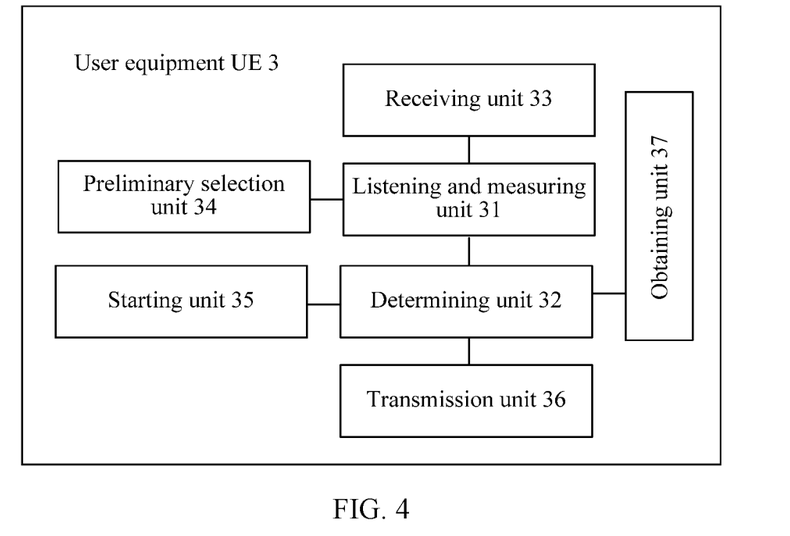
FIG. 4 is a schematic structural diagram of another user equipment UE according to an embodiment of the present invention.

Optionally, as shown in FIG. 4, the UE 3 further includes a preliminary selection unit 34, configured to:

determine a value of a receive performance parameter of the UE according to a signal received by using a synchronization channel and/or a broadcast channel, where the receive performance parameter includes one or more of the following: a signal-to-noise ratio, a receive level, a signal to interference plus noise ratio, or signal strength; and determine a control channel that meets a preliminary selection condition in the at least two control channels as the first control channel, where the control channel that meets the preliminary selection condition includes a control channel whose receive performance parameter has a value greater than or equal to K, where K is a sum of a demodulation threshold and a preliminary selection threshold of the control channel, and the preliminary selection threshold is greater than or equal to zero.

Optionally, M control channels are configured in a cell in which the UE is located, where M≥2, and M is an integer; in a sequence obtained by sorting the M control channels in ascending order by demodulation thresholds, a demodulation threshold of an $i^{th}$ control channel is an $i^{th}$ demodulation threshold, where 1≤i≤M, and i is an integer; the value of the receive performance parameter is k; a sum of the $i^{th}$ demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k≤$K_{i+1}$, and 1≤i≤M-1, the control channel that meets the preliminary selection condition is a control channel having the $i^{th}$ demodulation threshold in the M control channels.

Optionally, when a quantity of control channels that meet the preliminary selection condition is greater than 1, the preliminary selection unit 34 is specifically configured to:

randomly select a control channel from all of the control channels that meet the preliminary selection condition as the first control channel; or determine, according to an identifier of the UE, the first control channel from all of the control channels that meet the preliminary selection condition; or determine the first control channel according to a received notification message that is sent by the base station, where the notification message carries information about a control channel that has lowest load and that is determined by the base station according to load statuses of all of the control channels that meet the preliminary selection condition; or determine the first control channel according to load statuses of all of the control channels that meet the preliminary selection condition.

Optionally, the determining unit 32 is further configured to:

when i=M, if k<$K_i'$, determine a new target control channel from other M-1 control channels, where $K_i'$≤$K_i$; or when 1<i≤M-1, if k<$K_i'$ or k≥$K_{i+1}'$, determine a new target control channel from other M-1 control channels, where $K_i'$≤$K_i$, and $K_{i+1}'$≥$K_{i+1}$; or when i=1, if k≥$K_{i+1}'$, determine a new target control channel from other M-1 control channels, where $K_{i+1}'$≥$K_{i+1}$.

Optionally, the first control channel is a control channel of the cell in which the UE is located; and the determining unit 32 is further configured to: when determining, according to the value of the performance parameter, that the first control channel does not meet the residence condition, if there is a control channel that meets the residence condition in other control channels of the cell in which the UE is located, determine a control channel that meets the residence condition in the other control channels as the target control channel; or as shown in FIG. 4, the UE 3 further includes a starting unit 35, configured to: when it is determined, according to the value of the performance parameter, that the first control channel does not meet the residence condition, if there is no control channel that meets the residence condition in other control channels of the cell in which the UE is located, start a cell reselection mechanism or a cell selection mechanism.

Optionally, as shown in FIG. 4, the UE 3 further includes a transmission unit 36; and the determining unit 32 is further configured to determine a random access resource corresponding to the target control channel, and the transmission unit 36 is configured to send a random access message to the base station according to the random access resource, where the random access message is used to instruct the base station to determine the target control channel of the UE according to the random access resource; or the transmission unit 36 is configured to send a random access message to the base station, where the random access message includes channel information of the target control channel, and the random access message is used to notify the base station of the target control channel of the UE.

Optionally, as shown in FIG. 4, the UE 3 further includes:

an obtaining unit 37, configured to obtain an initial transmit power according to a modulation and coding scheme of a random access channel corresponding to the target control channel;

the determining unit 32 is further configured to: when the initial transmit power is greater than a maximum transmit power of the UE, re-determine a random access channel corresponding to the target control channel and/or a target control channel, so that a re-obtained initial transmit power is less than or equal to the maximum transmit power of the UE; and the transmission unit 36 is specifically configured to send the random access message to the base station by using the re-obtained initial transmit power.

The user equipment UE provided in this embodiment of the present invention is applied to a communications system including at least two control channels. The UE measures a value of a performance parameter of a signal received by using a first control channel; and when determines, according to the value of the performance parameter, that the first control channel meets a residence condition, determines the first control channel as a target control channel. In this technical solution, a residence condition may be set, so as to enable the UE to select a target control channel suitable for itself.

In a hardware implementation, the transmission unit may be a transmitter, the receiving unit may be a receiver, and the transmitter and the receiver may be integrated to constitute a transceiver. The listening and measuring unit, the determining unit, the starting unit, and the like may be built in or independent of a processor of the user equipment UE in a hardware form or may be stored in a memory of the UE in a software form, so that the processor invokes and performs operations corresponding to the foregoing modules.

Figure 5:
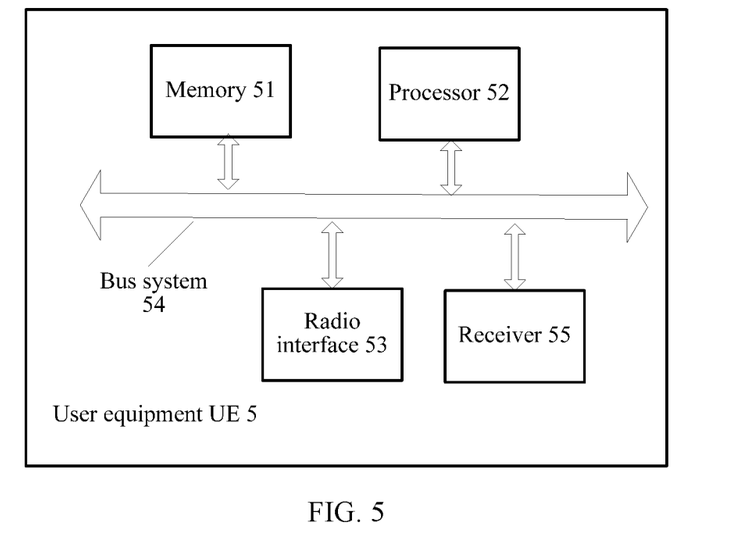
FIG. 5 is a schematic structural diagram of another user equipment UE according to an embodiment of the present invention.

FIG. 5 shows user equipment UE 5 according to an embodiment of the present invention. The UE 5 is configured to execute the method for selecting a control channel that is provided in the foregoing embodiments. For relevant explanations in this embodiment, refer to the foregoing embodiments. The UE 5 includes a memory 51, a processor 52, and a radio interface 53.

The memory 51 and the processor 52 are coupled with each other by the bus system 54. In addition to a data bus, the bus system 54 may further include a power bus, a control bus, a status signal bus, and the like. However, for clear description, various buses are marked as the bus system 54 in the figure.

The radio interface 53 is configured to provide communication between the UE 5 and a base station or another network node.

The memory 51 is configured to store a program. Specifically, the program may include program code, and the program code includes a computer operation instruction.

The processor 52 executes the program stored in the memory 51, to implement the method for selecting a control channel that is provided in the embodiments of the present invention, including:

listening to a first control channel, and measuring a value of a performance parameter of a signal received by using the first control channel, where the performance parameter includes one or more of the following: a signal-to-noise ratio, a receive level, a signal to interference plus noise ratio, or signal strength, and the first control channel is one of the at least two control channels; and when determining, according to the value of the performance parameter, that the first control channel meets a residence condition, determining the first control channel as a target control channel, where the target control channel is used to receive downlink control information sent by a base station.

For example, the memory 51 may include a high-speed random access memory (RAM for short), and may further include a non-volatile memory, for example, at least one magnetic disk memory.

The processor 52 may be a central processing unit (CPU), a microprocessor, a single-chip microcomputer, or the like.

The bus system 54 may be an industry standard architecture (ISA for short) bus, a peripheral component interconnect (PCI for short) bus, an extended industry standard architecture (EISA for short) bus, or the like. The bus system 54 may include an address bus, a data bus, a control bus, and the like. For convenience of representation, only one bold line is used for representation in FIG. 5, but it does not represent that there is only one bus or one type of bus.

It should be noted that, during specific implementation, the UE 5 may further include a receiver 55 configured to receive a signal by using the first control channel. Certainly, in the following optional implementation manners, the receiving unit may further be configured to receive other information, which is not enumerated herein.

Optionally, that the first control channel meets a residence condition includes: the value of the performance parameter is greater than or equal to a sum of a demodulation threshold and a residence threshold of the first control channel, and the residence threshold is greater than or equal to zero.

Optionally, that the first control channel meets a residence condition further includes: the signal received by using the first control channel is successfully decoded.

Optionally, the processor 52 is further configured to:

determine a value of a receive performance parameter of the UE according to a signal received by using a synchronization channel and/or a broadcast channel, where the receive performance parameter includes one or more of the following: a signal-to-noise ratio, a receive level, a signal to interference plus noise ratio, or signal strength; and determine a control channel that meets a preliminary selection condition in the at least two control channels as the first control channel, where the control channel that meets the preliminary selection condition includes a control channel whose receive performance parameter has a value greater than or equal to K, where K is a sum of a demodulation threshold and a preliminary selection threshold of the control channel, and the preliminary selection threshold is greater than or equal to zero.

Optionally, M control channels are configured in a cell in which the UE is located, where M≥2, and M is an integer; in a sequence obtained by sorting the M control channels in ascending order by demodulation thresholds, a demodulation threshold of an $i^{th}$ control channel is an $i^{th}$ demodulation threshold, where 1≤i≤M, and i is an integer; the value of the receive performance parameter is k; a sum of the $i^{th}$ demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k<$K_{i+1}$, and 1≤i≤M−1, the control channel that meets the preliminary selection condition is a control channel having the $i^{th}$ demodulation threshold in the M control channels.

Optionally, when a quantity of control channels that meet the preliminary selection condition is greater than 1, the processor 52 is specifically configured to:

randomly select a control channel from all of the control channels that meet the preliminary selection condition as the first control channel; or determine, according to an identifier of the UE, the first control channel from all of the control channels that meet the preliminary selection condition; or determine the first control channel according to a received notification message that is sent by the base station, where the notification message carries information about a control channel that has lowest load and that is determined by the base station according to load statuses of all of the control channels that meet the preliminary selection condition; or determine the first control channel according to load statuses of all of the control channels that meet the preliminary selection condition.

Optionally, the target control channel is an $i^{th}$ control channel; the processor 52 is further configured to:

when i=M, if k<$K_i'$, determine a new target control channel from other M−1 control channels, where $K_i'\le K_i$; or when 1<i≤M−1, if k<$K_i'$ or k≥$K_{i+1}^1$, determine a new target control channel from other M−1 control channels, where $K_i'\le K_i$, and $K_{i+1}'\ge K_{i+1}$; or when i=1, if k≥$K_{i+1}^1$, determine a new target control channel from other M−1 control channels, where $K_{i+1}'\ge K_{i+1}$.

Optionally, the first control channel is a control channel of the cell in which the UE is located; and the processor 52 is further configured to:

when determining, according to the value of the performance parameter, that the first control channel does not meet the residence condition, if there is a control channel that meets the residence condition in other control channels of the cell in which the UE is located, determine a control channel that meets the residence condition in the other control channels as the target control channel; or when determining, according to the value of the performance parameter, that the first control channel does not meet the residence condition, if there is no control channel that meets the residence condition in other control channels of the cell in which the UE is located, start a cell reselection mechanism or a cell selection mechanism.

Figure 6:
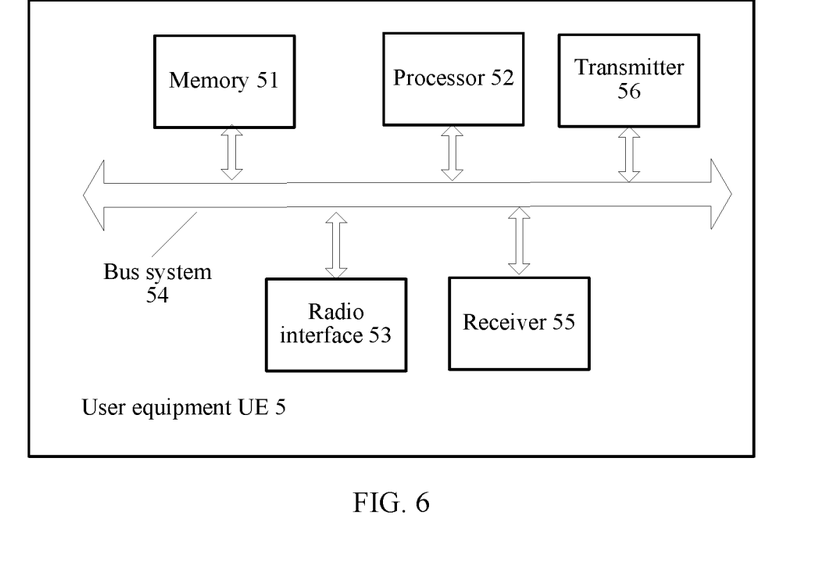
FIG. 6 is a schematic structural diagram of another user equipment UE according to an embodiment of the present invention.

Optionally, as shown in FIG. 6, the UE 5 further includes a transmitter 56;

the processor 52 is further configured to determine a random access resource corresponding to the target control channel, and the transmitter 56 is configured to send a random access message to the base station according to the random access resource, where the random access message is used to instruct the base station to determine the target control channel of the UE according to the random access resource; or the transmitter 56 is configured to send a random access message to the base station, where the random access message includes channel information of the target control channel, and the random access message is used to notify the base station of the target control channel of the UE.

Optionally, the processor 52 is further configured to:

obtain an initial transmit power according to a modulation and coding scheme of a random access channel corresponding to the target control channel; and when the initial transmit power is greater than a maximum transmit power of the UE, re-determine a random access channel corresponding to the target control channel and/or a target control channel, so that a re-obtained initial transmit power is less than or equal to the maximum transmit power of the UE; and the transmitter 56 is specifically configured to send the random access message to the base station by using the re-obtained initial transmit power.

The user equipment UE provided in this embodiment of the present invention is applied to a communications system including at least two control channels. The UE measures a value of a performance parameter of a signal received by using a first control channel; and when determining, according to the value of the performance parameter, that the first control channel meets a residence condition, determines the first control channel as a target control channel. In this technical solution, a residence condition may be set, so as to enable the UE to select a target control channel suitable for itself.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a RAM, a magnetic disk, or an optical disc.

What is claimed is:

1. A method for selecting a control channel, applied to a communications system in which at least two control channels are configured, wherein the method comprises:

determining a value of a receive performance parameter of a user equipment (UE) according to a signal received by using a synchronization channel and/or a broadcast channel, wherein the receive performance parameter comprises one or more of the following: a signal-to-noise ratio, a receive level, a signal to interference plus noise ratio, or signal strength;

determining a control channel that meets a preliminary selection condition in the at least two control channels as the first control channel, wherein the control channel that meets the preliminary selection condition comprises: a control channel whose receive performance parameter has a value greater than or equal to K, wherein K is a sum of a demodulation threshold and a preliminary selection threshold of the control channel, and the preliminary selection threshold is greater than or equal to zero;

listening, by the UE, to a first control channel, and measuring a value of a performance parameter of a signal received by using the first control channel, wherein the performance parameter comprises one or more of the following: a signal-to-noise ratio, a receive level, a signal to interference plus noise ratio, or signal strength, and the first control channel is one of the at least two control channels; and when determining, according to the value of the performance parameter, that the first control channel meets a residence condition, determining the first control channel as a target control channel, wherein the target control channel is used to receive downlink control information sent by a base station, wherein M control channels are configured in a cell in which the UE is located, wherein:

M≥2, and M is an integer;

in a sequence obtained by sorting the M control channels in ascending order by demodulation thresholds, a demodulation threshold of an i-th control channel is an i-th demodulation threshold, wherein 1≤i≤M, and i is an integer;

the value of the receive performance parameter is k; and a sum of the $i^{th}$ demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k≤$K_{i+1}$, and 1≤i≤M−1, the control channel that meets the preliminary selection condition is a control channel having the i-th demodulation threshold in the M control channels.

2. The method according to claim 1, wherein that the first control channel meets a residence condition comprises: the value of the performance parameter is greater than or equal to a sum of a demodulation threshold and a residence threshold of the first control channel, and the residence threshold is greater than or equal to zero.

3. The method according to claim 2, wherein that the first control channel meets a residence condition further comprises: the signal received by using the first control channel is successfully decoded.

4. The method according to claim 1, wherein when a quantity of control channels that meet the preliminary selection condition is greater than 1, the determining a control channel that meets a preliminary selection condition in the at least two control channels as the first control channel comprises:

randomly selecting a control channel from all of the control channels that meet the preliminary selection condition as the first control channel; or determining, according to an identifier of the UE, the first control channel from all of the control channels that meet the preliminary selection condition; or receiving a notification message sent by the base station, and determining the first control channel according to the notification message, wherein the notification message carries information about a control channel that has lowest load and that is determined by the base station according to load statuses of all of the control channels that meet the preliminary selection condition; or determining the first control channel according to load statuses of all of the control channels that meet the preliminary selection condition.

5. The method according to claim 1, wherein the target control channel is the $i^{th}$ control channel; and after the determining the target control channel, the method further comprises:

when i=M, if k<$K_i$', determining a new target control channel from other M−1 control channels, wherein $K_i$'≤$K_i$; or when 1<i≤M−1, if k<$K_i$' or k ≥$K_{i+1}$', determining a new target control channel from other M−1 control channels, wherein $K_i$'≤$K_i$, and $K_{i+1}$'≥$K_{i+1}$; or when i=1, if k≥$K_{i+1}$', determining a new target control channel from other M−1 control channels, wherein $K_{i+1}$'≥$K_{i+1}$.

6. The method according to claim 1, wherein the first control channel is a control channel of the cell in which the UE is located; and when determining, according to the value of the performance parameter, that the first control channel does not meet the residence condition, the method further comprises:

if there is a control channel that meets the residence condition in other control channels of the cell in which the UE is located, determining a control channel that meets the residence condition in the other control channels as the target control channel; or if there is no control channel that meets the residence condition in other control channels of the cell in which the UE is located, starting a cell reselection mechanism or a cell selection mechanism.

7. The method according to claim 1, wherein after the determining the target control channel, the method further comprises:

determining a random access resource corresponding to the target control channel, and sending a random access message to the base station according to the random access resource, wherein the random access message is used to instruct the base station to determine the target control channel of the UE according to the random access resource; or sending a random access message to the base station, wherein the random access message comprises channel information of the target control channel, and the random access message is used to notify the base station of the target control channel of the UE.

8. The method according to claim 7, wherein before the sending a random access message to the base station, the method further comprises:

obtaining an initial transmit power according to a modulation and coding scheme of a random access channel corresponding to the target control channel; and when the initial transmit power is greater than a maximum transmit power of the UE, re-determining a random access channel corresponding to the target control channel and/or a target control channel, so that a re-obtained initial transmit power is less than or equal to the maximum transmit power of the UE; and the sending a random access message to the base station comprises:

sending the random access message to the base station by using the re-obtained initial transmit power.

9. A user equipment (UE), applied to a communications system in which at least two control channels are configured, wherein the UE comprises:

a processor, configured to:

determine a value of a receive performance parameter of the UE according to a signal received by using a synchronization channel and/or a broadcast channel, wherein the receive performance parameter comprises one or more of the following: a signal-to-noise ratio, a receive level, a signal to interference plus noise ratio, or signal strength;

determine a control channel that meets a preliminary selection condition in the last at least two control channels as the first control channel, wherein the control channel that meets the preliminary selection condition comprises: a control channel whose receive performance parameter has a value greater than or equal to K, wherein K is a sum of a demodulation threshold and a preliminary selection threshold of the control channel, and the preliminary selection threshold is greater than or equal to zero;

listen to a first control channel, and measure a value of a performance parameter of a signal received by using the first control channel, wherein the performance parameter comprises one or more of the following: a signal-to-noise ratio, a receive level, a signal to interference plus noise ratio, or signal strength, and the first control channel is one of the at least two control channels; and the processor is further configured to: when determining, according to the value of the performance parameter, that the first control channel meets a residence condition, determine the first control channel as a target control channel, wherein the target control channel is used to receive downlink control information sent by a base station, wherein M control channels are configured in a cell in which the UE is located, wherein:

M≥2, and M is an integer;

in a sequence obtained by sorting the M control channels in ascending order by demodulation thresholds, a demodulation threshold of an i-th control channel is an i-th demodulation threshold, wherein 1≤i≤M, and i is an integer;

the value of the receive performance parameter is k; and a sum of the i-th demodulation threshold and the preliminary selection threshold is $K_i$; and when k≥$K_i$, and i=M, the control channel that meets the preliminary selection condition is a control channel having a maximum demodulation threshold in the M control channels; or when $K_i$≤k≤$K_{i+i}$, and 1≤i≤M−1, the control channel that meets the preliminary selection condition is a control channel having the i-th demodulation threshold in the M control channels.

10. The UE according to claim 9, wherein that the first control channel meets a residence condition comprises: the value of the performance parameter is greater than or equal to a sum of a demodulation threshold and a residence threshold of the first control channel, and the residence threshold is greater than or equal to zero.

11. The UE according to claim 10, wherein that the first control channel meets a residence condition further comprises: the signal received by using the first control channel is successfully decoded.

12. The UE according to claim 9, wherein when a quantity of control channels that meet the preliminary selection condition is greater than 1, the processor is specifically configured to:

randomly select a control channel from all of the control channels that meet the preliminary selection condition as the first control channel; or determine, according to an identifier of the UE, the first control channel from all of the control channels that meet the preliminary selection condition; or determine the first control channel according to a received notification message that is sent by the base station, wherein the notification message carries information about a control channel that has lowest load and that is determined by the base station according to load statuses of all of the control channels that meet the preliminary selection condition; or determine the first control channel according to load statuses of all of the control channels that meet the preliminary selection condition.

13. The UE according to claim 9, wherein the target control channel is an $i^{th}$ control channel; and the processor is further configured to:

when i=M, if k<$K_i'$, determine a new target control channel from other M−1 control channels, wherein $K_i'$≤$K_i$; or when 1<i≤M−1, if k<$K_i'$ or k≥$K_{i+1}'$, determine a new target control channel from other M−1 control channels, wherein $K_i'$≤$K_i$, and $K_{i+1}'$≥$K_{i+1}$; or when i=1, if k≥$K_{i+1}'$, determine a new target control channel from other M−1 control channels, wherein $K_{i+1}'$≥$K_{i+1}$.

14. The UE according to claim 9, wherein the first control channel is a control channel of the cell in which the UE is located; and the processor is further configured to: when determining, according to the value of the performance parameter, that the first control channel does not meet the residence condition, if there is a control channel that meets the residence condition in other control channels of the cell in which the UE is located, determine a control channel that meets the residence condition in the other control channels as the target control channel; or the processor is further configured to: when it is determined, according to the value of the performance parameter, that the first control channel does not meet the residence condition, if there is no control channel that meets the residence condition in other control channels of the cell in which the UE is located, start a cell reselection mechanism or a cell selection mechanism.

15. The UE according to claim 9, wherein the UE further comprises a transmitter; and the processor is further configured to determine a random access resource corresponding to the target control channel, and the transmitter is configured to send a random access message to the base station according to the random access resource, wherein the random access message is used to instruct the base station to determine the target control channel of the UE according to the random access resource; or the transmitter is configured to send a random access message to the base station, wherein the random access message comprises channel information of the target control channel, and the random access message is used to notify the base station of the target control channel of the UE.

16. The UE according to claim 15, wherein the processor is further configured to obtain an initial transmit power according to a modulation and coding scheme of a random access channel corresponding to the target control channel;

the processor is further configured to: when the initial transmit power is greater than a maximum transmit power of the UE, re-determine a random access channel corresponding to the target control channel and/or a target control channel, so that a re-obtained initial transmit power is less than or equal to the maximum transmit power of the UE; and the transmitter is specifically configured to send the random access message to the base station by using the re-obtained initial transmit power.

* * * * *